United States Patent
Hallenstål et al.

(10) Patent No.: US 10,523,720 B2
(45) Date of Patent: Dec. 31, 2019

(54) P-CSCF RECOVERY AND REREGISTRATION

(71) Applicant: TELEFONAKTIEBOLAGET LM ERICSSON (PUBL), Stockholm (SE)

(72) Inventors: Magnus Hallenstål, Täby (SE); Fredrik Lindholm, Tokyo (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 33 days.

(21) Appl. No.: 15/553,259

(22) PCT Filed: Feb. 27, 2015

(86) PCT No.: PCT/EP2015/054218
§ 371 (c)(1),
(2) Date: Aug. 24, 2017

(87) PCT Pub. No.: WO2016/134791
PCT Pub. Date: Sep. 1, 2016

(65) Prior Publication Data
US 2018/0241784 A1    Aug. 23, 2018

(51) Int. Cl.
*H04W 12/04* (2009.01)
*H04W 12/06* (2009.01)
*H04W 24/04* (2009.01)
*H04L 29/06* (2006.01)
*H04L 29/08* (2006.01)
*H04W 36/16* (2009.01)

(52) U.S. Cl.
CPC ........ *H04L 65/1073* (2013.01); *H04L 65/105* (2013.01); *H04L 65/1006* (2013.01); *H04L 65/1016* (2013.01); *H04L 65/80* (2013.01); *H04L 67/1034* (2013.01); *H04W 12/04* (2013.01); *H04W 12/06* (2013.01); *H04W 24/04* (2013.01)

(58) Field of Classification Search
CPC ............. H04L 65/1006; H04L 65/1016; H04L 65/105; H04L 65/1073; H04W 12/06; H04W 24/04
See application file for complete search history.

(56) References Cited

U.S. PATENT DOCUMENTS

| | | | |
|---|---|---|---|
| 7,746,836 B2 * | 6/2010 | Jentz | H04W 36/0033 370/328 |
| RE46,361 E * | 4/2017 | Lim | H04L 65/1016 |
| 9,706,019 B2 * | 7/2017 | Du | H04L 69/40 |
| 10,148,487 B2 * | 12/2018 | Kunz | H04L 65/1016 |

(Continued)

FOREIGN PATENT DOCUMENTS

WO   2008085010 A1   7/2008
WO   2013174413 A1   11/2013

*Primary Examiner* — Ahmed Elallam

(57) ABSTRACT

A method in an IP multimedia subsystem, IMS, of a telecommunications network. The loss of a secure association between a P-CSCF of the IMS and a user equipment, UE, served by the P-CSCF is detected, or a UE is relocated from a further P-CSCF to the first mentioned P-CSCF. The first mentioned P-CSCF sends a reregistration request to the UE; receives a SIP REGISTER message from the UE; and performs P-CSCF registration with the UE including establishing a new secure association with the UE.

19 Claims, 3 Drawing Sheets

(56) References Cited

U.S. PATENT DOCUMENTS

| | | | |
|---|---|---|---|
| 2007/0207805 A1* | 9/2007 | Pallares Lopez | H04W 36/0033 455/436 |
| 2008/0092226 A1* | 4/2008 | Horvath | H04L 63/164 726/12 |
| 2008/0182575 A1 | 7/2008 | Torres et al. | |
| 2009/0170512 A1* | 7/2009 | Regnier | H04L 65/1073 455/435.1 |
| 2010/0062767 A1* | 3/2010 | Leis | H04L 69/40 455/435.1 |
| 2010/0165833 A1* | 7/2010 | Du | H04L 69/40 370/217 |
| 2012/0082136 A1* | 4/2012 | Dutta | H04W 36/0038 370/331 |
| 2013/0272253 A1* | 10/2013 | Veenstra | H04W 72/0486 370/329 |
| 2013/0286843 A1* | 10/2013 | Nishida | H04W 76/00 370/235 |
| 2016/0380802 A1* | 12/2016 | Kunz | H04L 65/1016 370/216 |

\* cited by examiner

P-CSCF RECOVERY AND REREGISTRATION

This application is a 371 of International Application No. PCT/EP2015/054218, filed Feb. 27, 2015, the disclosure of which is fully incorporated herein by reference.

TECHNICAL FIELD

The invention relates to recovery in an IMS network, and in particular to methods for recovery and reregistration of a P-CSCF, and to nodes implementing such methods.

BACKGROUND

In order to ensure security in telecommunications networks, user equipments (UEs) connected to an IP Multimedia Subsystem (IMS) network have a secure association with the IMS. In current standards, this secure association is between the UE and the Proxy Call Session Control Function, P-CSCF, of the IMS network. The secure association is created when the terminal registers with the IMS.

The P-CSCF is the contact point between the IMS and the UE, i.e. all communications between the UE and the IMS are routed via the P-CSCF to which the UE is registered. Therefore, any malfunction of the P-CSCF will cause a loss of service for UEs registered to the P-CSCF. One possible failure mode of the P-CSCF is the loss of the secure association with the UE. In the case of originating sessions (i.e. session requests sent by the UE), the UE will recognise that a malfunction has occurred and perform re-registration. Re-registration may result in the UE being assigned to a new P-CSCF, following a P-CSCF discovery step. In the case of terminating sessions (i.e. session requests sent to the UE), the session request or ongoing session will be lost.

There are several current solutions which address the problem of terminating sessions. These solutions operate by means of packet core network (i.e. the network between the P-CSCF and the UE) mechanisms to force the UE to re-register. For example, notifications may be generated within the IMS and passed down to the packet core network, or the packet core network itself may detect that the P-CSCF has failed. These procedures require the restoration to be performed outside of the IMS, which requires nodes in the packet core network to be adapted to handle the procedures, and may involve further latency.

In order to ensure low failover times if a P-CSCF malfunctions, redundant nodes may be provided which can "step in" for a failed P-CSCF. However, in order to ensure that the redundant node is able to maintain the secure association, IPSec data must be backed up frequently from the primary node.

Recently, cloud-based P-CSCF architectures have been developed, where the duties of a single P-CSCF are shared between multiple physical or virtual instances. For load balancing or other reasons, it may be desired to relocate UEs to other instances of the P-CSCF, which could cause a change of P-CSCF IP address. Since the IPSec protocol contains security elements which are specific to the IP address of the sender and receiver, this would cause the secure association to be lost. However, since there would not be an obvious failure of the P-CSCF, it would not trigger existing restoration procedures in most cases (e.g. unless the UE attempted to initiate an outgoing session). It is therefore desirable to have a smoother means of handling such transitions so that the IMS service can be made more independent from the underlying IP structure.

SUMMARY

According to an aspect of the invention, there is provided a method in an IP multimedia subsystem, IMS, of a telecommunications network. The loss of a secure association between a P-CSCF of the IMS and a user equipment, UE, served by the P-CSCF is detected, or a UE is relocated from a further P-CSCF to the first mentioned P-CSCF. The first mentioned P-CSCF sends a reregistration request to the UE; receives a SIP REGISTER message from the UE; and performs P-CSCF registration with the UE including establishing a new secure association with the UE.

According to a further aspect of the present invention, there is provided apparatus configured to operate as a Proxy Call Session Control Function, P-CSCF, in a telecommunications network. The apparatus comprises a transceiver and a reregistration processor. The transceiver is configured to communicate with user equipments, UEs. The reregistration processor is configured to:
 in response to detection or notification of a loss of a secure association between the P-CSCF and one of the UEs or a UE being relocated to the P-CSCF, send a reregistration request to the UE;
 receive, via the transceiver, a SIP REGISTER message from the UE; and perform P-CSCF registration with the UE including establishing a new secure association with the P-CSCF.

According to a yet further aspect there is provided apparatus configured to operate as a user equipment, UE. The apparatus comprises a transceiver and a reregistration processor. The transceiver is configured to communicate with a proxy call session control function, P-CSCF, of a telecommunications network. The reregistration processor is configured to:
 receive, via the transceiver, a reregistration request from the P-CSCF;
 in response to receiving the reregistration request, send a SIP REGISTER message to the P-CSCF;
 perform P-CSCF registration with the P-CSCF.

According to a yet further aspect, there is provided computer program comprising computer readable code which, when run on an apparatus, causes the apparatus to perform a method according to the first aspect.

DETAILED DESCRIPTION

Figure 1:
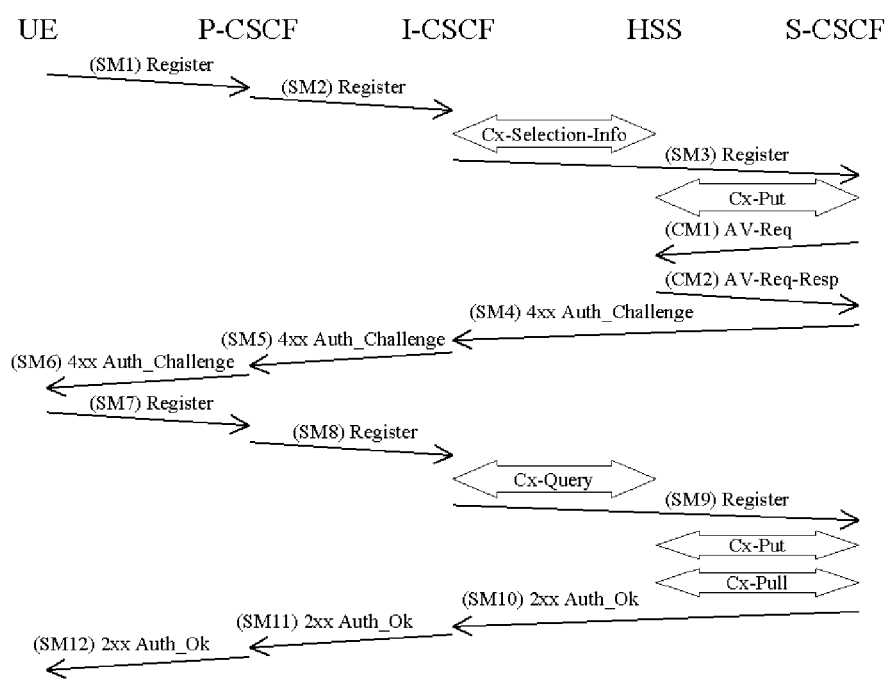
FIG. 1 is a signalling diagram showing a registration procedure in an IMS network.

It is desirable to have a P-CSCF restoration procedure which can be performed mainly in the IMS, without involving the packet core network directly. It is further desirable to have a method which allows easier reallocation of a P-CSCF when such reallocation would not allow the security association from the old P-CSCF (or virtual instance of a cloud-based P-CSCF) to be transferred to the new P-CSCF (or new virtual instance).

In the present disclosure, three failure cases or procedures will be considered. In the first case, a P-CSCF loses the security association with a UE, but otherwise continues to function normally. In the second case, a complete failure of a P-CSCF occurs, preventing the P-CSCF from continuing to serve the UE in any way. In the third case, handling of a UE is to be transferred from a first P-CSCF to a second P-CSCF, either in response to an error in the first P-CSCF, or for other reasons such as load balancing. In each case, the P-CSCF(s) may be a virtual instance(s) of a cloud based P-CSCF.

In the first case, the failure may be detected internally by the P-CSCF, e.g. when the P-CSCF attempts to process a message addressed to the UE or a message sent by the UE, or when the P-CSCF detects some circumstance which would result in loss of the secure association (e.g. change of IP address). In the second case, the S-CSCF may detect the failure of the P-CSCF due to the lack of acknowledgement of a message sent towards the UE. In either case involving the failure of the P-CSCF, the failure detection mechanisms disclosed in 3GPP TS23.380 v12.0.0 may be used. The nature of the failure detection does not particularly affect the performance of the methods of this disclosure.

In the second and third cases, a second P-CSCF will be selected to serve the UE. This selection occurs within the IMS, e.g. by the S-CSCF, and may be based on current network traffic, the identity of the first P-CSCF, or any other suitable factor. This differs from the method of the current standards, in which the UE is notified of the failure by the packet core and then performs IMS registration procedures which will lead to selection of and registration with a new P-CSCF.

In any case, the result of the failure or transfer is that the UE is assigned to a P-CSCF which does not have a secure association with the UE. For the first case, this is the P-CSCF which the UE was originally assigned to, for the second and third cases, this is the second P-CSCF. For brevity, this will be referred to as the second P-CSCF through this description, but it should be noted that in the first case this may be the original P-CSCF (places where the methods differ if there is no change in P-CSCF will be noted).

In order to restore the secure association, the UE is required to re-register with the P-CSCF. However, the UE is currently unaware of the failure. The second P-CSCF sends a reregistration request to the UE. This prompts the UE to initiate a reregistration with the P-CSCF (which will be identified in the reregistration request at least as the sender of the request). The UE does not perform any P-CSCF discovery steps, and no node of the packet core network is involved except to transfer the messages to the UE.

It is noted that sending a simple request for re-registration with a P-CSCF outside of any security context may provide an additional security risk, since some malicious node could impersonate a P-CSCF which should be registered with the restore service. The re-registration would fail as the malicious P-CSCF would not be able to authenticate with the UE, but this could be used to perform a denial of service attack by causing the UE to disconnect from a legitimate P-CSCF. In order to prevent this, an addition to the above method is suggested below.

When the UE initially attaches to the first P-CSCF, the first P-CSCF generates a security token. This token may be generated from values known to both the UE and the P-CSCF, e.g. the Ck, Ik, or RAND values used during authentication of the UE, or it may be generated from values known only to the P-CSCF (e.g. a random number) which are then sent to the UE over the secure connection. Alternatively, the UE may provide a value for the generation of the security token over the secure association. The token therefore represents a secret shared between the UE and the P-CSCF. The first P-CSCF stores this token in some other node of the IMS, e.g. the S-CSCF or the HSS, so that it can be retrieved later in case of P-CSCF failure or transfer.

When P-CSCF failure or transfer occurs, the second P-CSCF (or, in the first case listed above, the original P-CSCF) retrieves the security token from the other node of the IMS, and includes this security token within the reregistration request. The UE will then attempt to authenticate the security token using the shared secret between the UE and the first P-CSCF, and will only proceed with the re-registration if the authentication succeeds.

As an alternative to the "shared secret" based security token, the security token may be a quantity digitally signed using the private key of a public-private key pair associated with the first P-CSCF. The UE may then authenticate the token by confirming that the digital signature is valid using the first P-CSCF's public key.

The UE may provide, for example upon initial attachment to the network, an indication that it supports the above method. This indication may be explicit or implicit in some other communication (e.g. providing a security token may be used as an implicit indication that the method is supported). The second P-CSCF may then determine whether the UE has provided such an indication, and the above method may only be used for UEs which support the method. For other UEs, the P-CSCF may fall back on existing standards.

Figure 2:
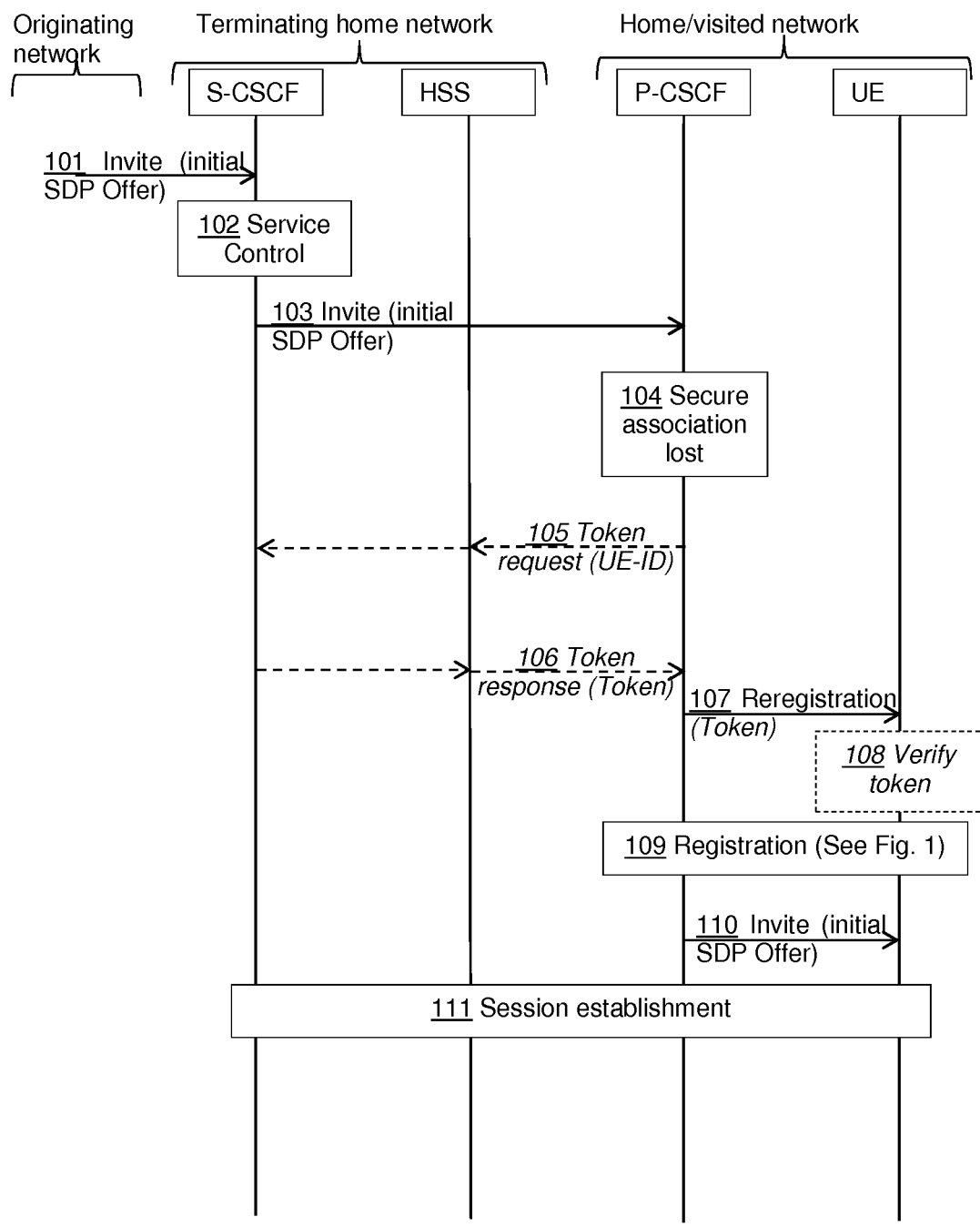
FIG. 2 is a signalling diagram showing an exemplary embodiment.
Figure 3:
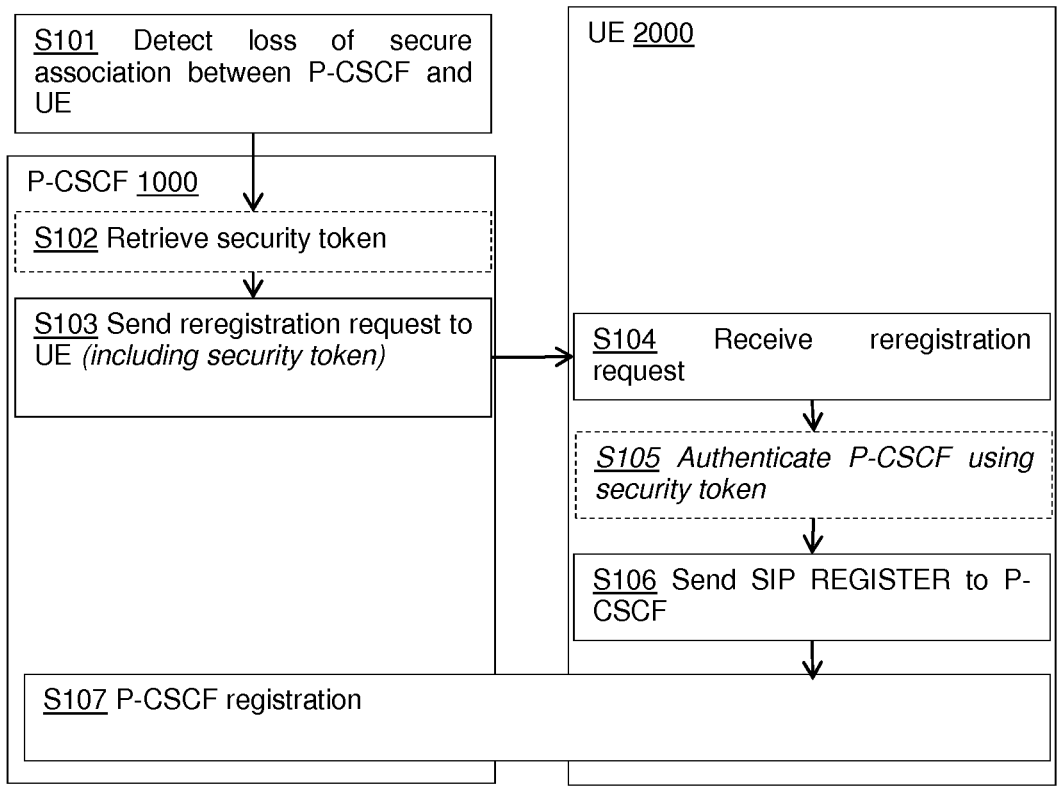
FIG. 3 is a flowchart of the exemplary embodiment.
Figure 4:
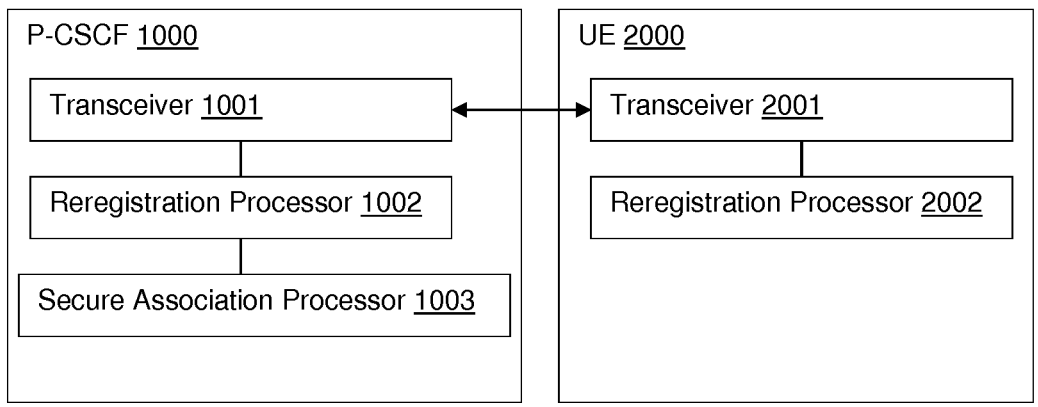
FIG. 4 is a schematic diagram showing a P-CSCF and a UE according to an exemplary embodiment.

An exemplary implementation of the above method will now be presented with reference to FIGS. 2, 3 and 4. FIG. 2 is a signalling diagram showing the signalling involved in the method, FIG. 3 is a flowchart showing the steps of the method at an abstracted level, and FIG. 4 is a schematic diagram of a UE and P-CSCF configured to implement the method. FIGS. 3 and 4 do not show the other nodes of the telecommunications network, as the method does not result in any changes to normal procedures at those nodes, and the skilled person could easily determine the actions at those nodes based on current standards. Elements in dotted lines and/or italics represent the optional step of using the security token described above.

The P-CSCF 1000 comprises a transceiver 1001, a reregistration processor 1002, and optionally a secure association processor 1003. The UE 2000 comprises a transceiver 2001, and a reregistration processor 2002.

A UE in an originating network sends a SIP INVITE request to the UE in the home network (shown by the signalling 101, 102 and 103). When the INVITE is received by the P-CSCF, the secure association processor determines that it has lost the secure association with the UE (104, S101). This may be due to a failure at the P-CSCF, or due to control being passed to the P-CSCF from a previous P-CSCF due to failure of the previous P-CSCF or by the network. Alternatively, failure of the previous P-CSCF may be detected by some other node of the IMS, and the remainder of the method may be triggered by this detection and the handover to the P-CSCF. If the security token is being used, the reregistration processor of the P-CSCF retrieves the security token (from the S-CSCF in this example, 105, 106, S102). The reregistration processor of the P-CSCF then causes the transceiver to send a reregistration request to the UE (including the security token if used, 107, S103). The UE receives the reregistration request via the transceiver (S104), and the reregistration processor of the UE verifies the security token (if used, 108, S105). The reregistration processor of the UE causes the transceiver to send a SIP REGISTER message to the P-CSCF, and performs registration with the P-CSCF (109, S105, S106). The registration is shown in more detail in FIG. 1. The registration proceeds according to current standards, except that a P-CSCF discovery step and any preceding steps are unnecessary as the P-CSCF for the UE has already been assigned (i.e. the P-CSCF that sent the reregistration request).

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method performed in an IP multimedia subsystem (IMS) of a telecommunications network, the method comprising:
    detecting a loss of a secure association between a P-CSCF of the IMS and a user equipment (UE) served by the P-CSCF;
    at the P-CSCF:
        sending a reregistration request to the UE;
        receiving a SIP REGISTER message from the UE; and
        performing P-CSCF registration with the UE including establishing a new secure association with the UE.

2. The method according to claim 1, wherein the step of detecting the loss of a secure association is performed at the P-CSCF.

3. The method according to claim 2, wherein said detecting the loss of a secure association between the P-CSCF and the UE comprises:
    receiving a message addressed to the UE;
    during processing of the message, determining that a security association for the UE is not available;
    and comprising, subsequent to the P-CSCF registration with the UE, the P-CSCF sending the message addressed to the UE to the UE.

4. The method according to claim 1, wherein the P-CSCF is a node of a distributed P-CSCF.

5. The method according to claim 1, wherein sending the reregistration request is performed in response to a failure of a second P-CSCF.

6. The method according to claim 1, and comprising, at the P-CSCF prior to sending the reregistration request, retrieving a security token associated with the secure association, wherein the reregistration request contains the security token.

7. The method according to claim 6, wherein the security token is or is derived from any one or more of:
    a pseudorandomly generated number;
    a key value generated during a previous registration of the UE;
    a CK value generated during a previous registration of the UE;
    an IK value generated during a previous registration of the UE; or
    a quantity digitally signed using a private key of the P-CSCF or a second P-CSCF.

8. The method according to claim 6, wherein retrieving the security token comprises sending a request for the security token associated with the secure association to a database of the telecommunications network, and receiving a message containing the security token from the database.

9. The method according to claim 1, wherein the reregistration request is contained within a SIP MESSAGE or SIP NOTIFY message.

10. A method in a user equipment (UE) connected to a telecommunications network, the method comprising:
    after a loss of a secure association between the UE and a Proxy Call Session Control Function (P-CSCF) of the telecommunications network, receiving a reregistration request from the P-CSCF;
    in response to receiving the reregistration request, sending a SIP REGISTER message to the P-CSCF; and
    performing P-CSCF registration with the P-CSCF including establishing a new secure association with the P-CSCF.

11. The method according to claim 10, wherein the reregistration request contains a security token and comprising, prior to sending the SIP REGISTER message, authenticating the P-CSCF using the security token.

12. The method according to claim 11 wherein the security token is or is derived from any one or more of:
    a pseudorandomly generated number;
    a key value generated during a previous registration of the UE;
    a CK value generated during a previous registration of the UE;
    an IK value generated during a previous registration of the UE; or
    a quantity digitally signed using a private key of the P-CSCF.

13. The method according to claim 11, wherein the step of authenticating the P-CSCF using the token comprises comparing the security token to a stored token.

14. The method according to claim 13, wherein the security token and the stored token are each or are each derived from any one or more of:
    a pseudorandomly generated number;
    a key value generated during a previous registration of the UE;
    a CK value generated during a previous registration of the UE;
    an IK value generated during a previous registration of the UE; or
    a quantity digitally signed using a private key of the P-CSCF.

15. An apparatus configured to operate as a Proxy Call Session Control Function (P-CSCF) in a telecommunications network, the apparatus comprising:
    a transceiver configured to communicate with user equipments (UEs); and
    a reregistration processor configured to:
        in response to detection or notification of a loss of a secure association between the P-CSCF and one of the UEs, send a reregistration request to the UE;
        receive, via the transceiver, a SIP REGISTER message from the UE; and
        perform P-CSCF registration with the UE including establishing a new secure association with the UE.

16. The apparatus according to claim 15, wherein the apparatus comprises a secure association processor configured to detect the loss of a secure association between the P-CSCF and the UE.

17. The apparatus according to claim 16, wherein the secure association processor is configured to detect the loss of a secure association by:
  receiving, via the transceiver, a message addressed to the UE;
  during processing of the message, determining that the secure association is not available; and
  the reregistration processor is configured to send the message addressed to the UE to the UE subsequent to performing P-CSCF registration with the UE.

18. The apparatus according to claim 15, wherein the reregistration processor is configured to, prior to sending the reregistration request, retrieve a security token associated with the secure association between the P-CSCF and the UE, and the reregistration processor is configured to include the token in the reregistration request.

19. The apparatus according to claim 18, wherein the apparatus comprises a second transceiver configured to communicate with a database, and the reregistration processor is configured to retrieve the security token by sending a request for the security token to the database via the second transceiver, and receiving a message containing the security token from the database via the second transceiver.

\* \* \* \* \*